(12) United States Patent
Moore

(10) Patent No.: US 12,192,828 B1
(45) Date of Patent: Jan. 7, 2025

(54) ORDERING MULTIPLE COMMANDS ISSUED BY MULTIPLE COMPUTING DEVICES IN A NETWORK, WHEN CHRONOLOGICAL ORDERING IS NOT POSSIBLE

(71) Applicant: SPIDEROAK, INC., Lenexa, KS (US)

(72) Inventor: Jonathan Andrew Crockett Moore, Portland, OR (US)

(73) Assignee: SpiderOak, Inc., Lenexa, KS (US)

( * ) Notice: Subject to any disclaimer, the term of this patent is extended or adjusted under 35 U.S.C. 154(b) by 0 days.

(21) Appl. No.: 18/426,327

(22) Filed: Jan. 29, 2024

Related U.S. Application Data

(63) Continuation of application No. 18/355,981, filed on Jul. 20, 2023, now Pat. No. 11,902,832.

(51) Int. Cl.
*H04W 28/086* (2023.01)
*H04W 28/08* (2023.01)

(52) U.S. Cl.
CPC ... *H04W 28/0862* (2023.05); *H04W 28/0925* (2020.05)

(58) Field of Classification Search
CPC .................. H04W 28/0862; H04W 28/0925
See application file for complete search history.

(56) References Cited

U.S. PATENT DOCUMENTS

| | | | |
|---|---|---|---|
| 10,225,751 B1 | 3/2019 | Liu | |
| 10,871,950 B2 * | 12/2020 | De Smet | G06F 16/9024 |
| 2018/0027473 A1 * | 1/2018 | Kalogridis | H04W 40/22 |
| | | | 370/235 |
| 2019/0238401 A1 * | 8/2019 | Cartaya | H04L 41/0895 |
| 2019/0340695 A1 * | 11/2019 | Bruns | G06N 5/02 |
| 2021/0091957 A1 | 3/2021 | Ford | |
| 2021/0096921 A1 * | 4/2021 | Banerjee | G06F 9/4881 |
| 2021/0110108 A1 * | 4/2021 | Maguire | G06F 16/9014 |
| 2021/0126867 A1 * | 4/2021 | Huang | H04L 67/104 |
| 2021/0263913 A1 * | 8/2021 | Boodman | G06F 16/235 |
| 2021/0264520 A1 * | 8/2021 | Cummings | G06Q 40/12 |
| 2022/0368596 A1 * | 11/2022 | Jakobsson | G06Q 20/3678 |
| 2023/0196139 A1 * | 6/2023 | Ackerman | G06F 30/20 |
| | | | 706/50 |

FOREIGN PATENT DOCUMENTS

WO   WO-2024132230 A1 *  6/2024

* cited by examiner

*Primary Examiner* — Mehmood B. Khan
(74) *Attorney, Agent, or Firm* — Perkins Coie LLP

(57) ABSTRACT

The system obtains a first acyclic graph including multiple nodes and edges connecting the multiple nodes. A process to create a weave of the first acyclic graph produces a matching weave when executed on the first acyclic graph by different computing devices. An addition of a node to the first acyclic graph produces a second acyclic graph. The addition of the node to the first acyclic graph changes the weave of the first acyclic graph. The system obtains a process to reach a global consensus among the multiple computing devices. The process indicates a criterion to satisfy prior to reaching the global consensus and determines whether the multiple computing devices in the network satisfy the criterion. Upon determining that the criterion is satisfied, the system adds a finalize node to the first acyclic graph to obtain a third acyclic graph. A weave of the third acyclic graph cannot change.

20 Claims, 12 Drawing Sheets

ORDERING MULTIPLE COMMANDS ISSUED BY MULTIPLE COMPUTING DEVICES IN A NETWORK, WHEN CHRONOLOGICAL ORDERING IS NOT POSSIBLE

CROSS-REFERENCE TO RELATED APPLICATIONS

The present application is a continuation of U.S. patent application Ser. No. 18/355,981, filed Jul. 20, 2023 entitled "ORDERING MULTIPLE COMMANDS ISSUED BY MULTIPLE COMPUTING DEVICES IN A NETWORK, WHEN CHRONOLOGICAL ORDERING IS NOT POSSIBLE," now U.S. Pat. No. 11,902,832, which is hereby incorporated by reference in its entirety.

BACKGROUND

Communication among multiple networked computing devices can fail due to failure of a computing device, a communication link, an obstacle in the communication path, etc. The failure can separate the network into multiple subnetworks each containing a subset of the computing devices. In some implementations, the subnetwork of computing devices may cease to operate. In other implementations, even if all subnetworks of computing devices continue to operate, the results of their separate operations are difficult to reconcile once the full network comes back online. For example, the clocks of the various computing devices may not be synchronized and/or may not be able to communicate with a central clock. Consequently, the order of commands issued by various subnetworks is difficult to determine and reconcile into a global order once the full network is operational.

BRIEF DESCRIPTION OF THE DRAWINGS

Detailed descriptions of implementations of the present invention will be described and explained through the use of the accompanying drawings.

Figure 1:
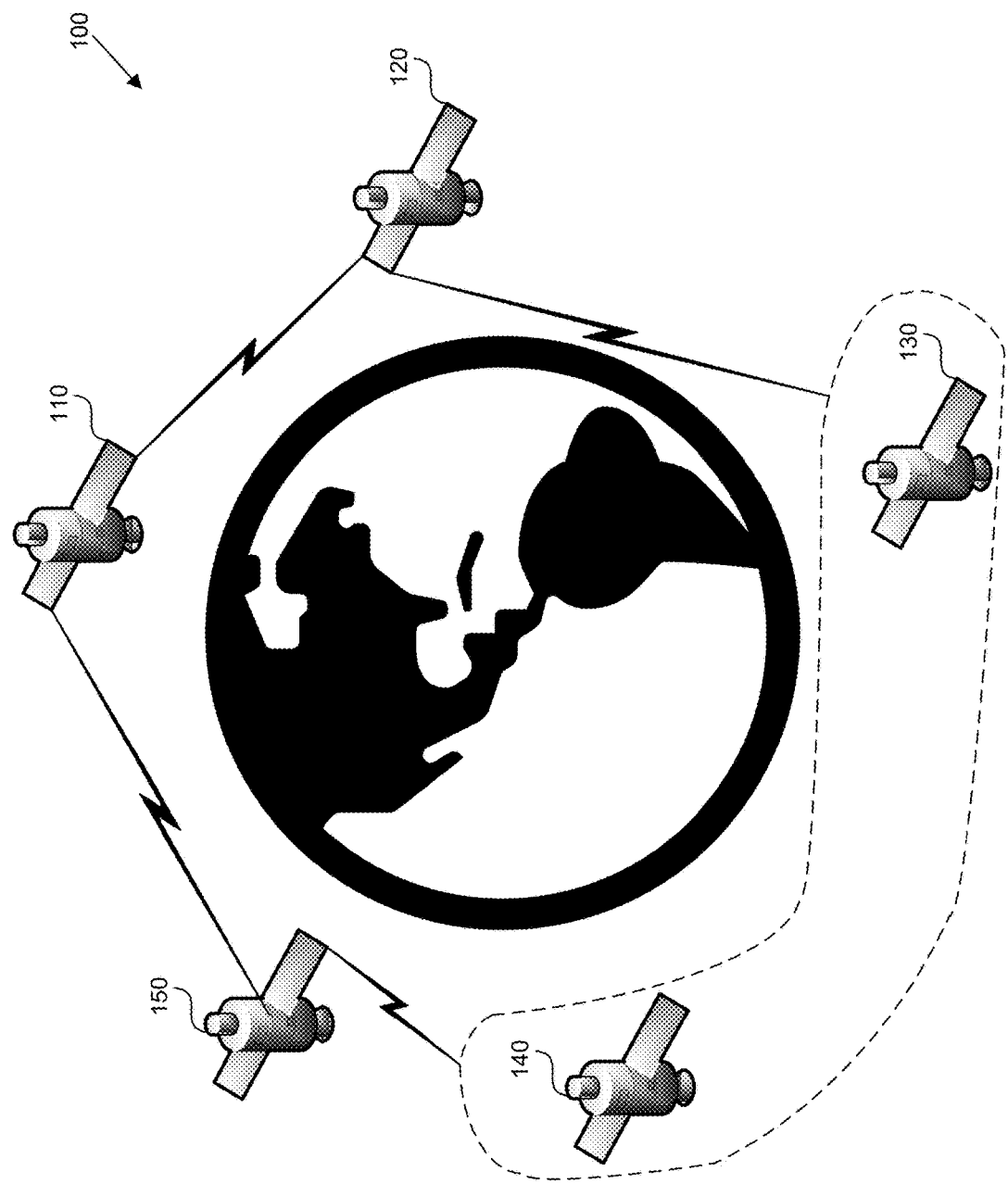
FIG. 1 shows an overview of a network made up of nodes that can fail to communicate with each other.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein is a system and method to order multiple commands issued by multiple computing devices in a network, when chronological ordering is not possible. The system obtains a directed acyclic graph including multiple nodes and multiple edges. A node in the directed acyclic graph represents a command issued by a computing device in the network. An edge among the multiple edges indicates a parent node among the multiple nodes and a child node among the multiple nodes to be included in a weave indicating a linear order of the multiple nodes. The parent node occurs before the child node in the weave. The directed acyclic graph includes a branch node having a child node A and a child node B, where the child node A and the child node B do not have a parent-child relationship indicating the weave.

The system orders the multiple nodes in the directed acyclic graph by ordering a portion of the multiple nodes according to a portion of the multiple edges indicating the parent-child relationship. The system orders the child node A and the child node B using the following two steps. First, the system obtains a priority A associated with a command A represented by the child node A and a priority B associated with the command B represented by the child node B. Based on the priority A and the priority B, the system creates the weave by ordering the commands A and B.

The weave can change based on the priority of the nodes added to the ends of the two branches. Consequently, the system fixes, e.g., makes permanent, a changing weave using a finalize command. The system obtains a directed acyclic graph A including multiple nodes and multiple directed edges connecting the multiple nodes. A node in the directed acyclic graph A represents a command issued by a computing device among multiple computing devices in a network susceptible to partition. A process to create a weave of the directed acyclic graph A produces a matching weave when executed on the directed acyclic graph A by two different computing devices among the multiple computing devices. The weave indicates a linear order of the multiple nodes. An addition of a node to the multiple nodes associated with the directed acyclic graph A produces a directed acyclic graph B. The addition of the node to the directed acyclic graph A changes the weave of the directed acyclic graph A.

The system obtains a process to reach a global consensus among the multiple computing devices, where the process indicates a criterion associated with the multiple computing devices to satisfy prior to reaching the global consensus. The criterion can indicate an autocratic consensus, unanimous consensus, or asynchronous Byzantine fault tolerance (BFT) consensus. The system determines whether the multiple computing devices in the network satisfy the criterion. Upon determining that the multiple computing devices in the network satisfy the criterion, the system adds a node including a finalize node to the directed acyclic graph A to obtain a directed acyclic graph C, where a weave of the directed acyclic graph C cannot change due to the finalize node. Upon determining that the multiple computing devices in the network do not satisfy the criterion, the system refuses to add the finalize node to the directed acyclic graph A.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Ordering Multiple Commands Issued by Multiple Computing Devices in a Network, when Chronological Ordering is not Possible FIG. 1 shows an overview of a network made up of nodes that can fail to communicate with each other. The disclosed system is a cryptographic protocol that does not assume a total global ordering of all events. In the disclosed system, the event graph can branch and merge much like the change history in a distributed revision control system such as Git.

The disclosed system 100 allows for continued operation of all network devices 110, 120, 130, 140, 150 during a network partition where a network of nodes is split into at least two groups of nodes that cannot communicate with each other. For example, the network devices 130, 140 can be cut off from the rest of the network devices 110, 120, 150, however each set of network devices 130, 140 and 110, 120, 150 can continue to function independently, issuing commands that can be recorded in a graph, as described in this application, until the full network is restored.

The system 100 always ensures availability to the nodes that can communicate with each other and provides global consistency when possible. The continued operation is allowed regardless of the size and number of partitions, which introduces new core challenges when designing protocols, in particular adversarial branching. Adversarial branching means that branching from the past and merging to the current state must not provide adversarial advantage. Specifically, adversarial branching means that given an acyclic graph of commands that are indexed as a collection of key-value pairs known as facts. At every state *s*, if an entity is not able to transition to state *s+1* by evaluating policy over a new command 'A' and the set of facts produced by *s*, they should not be able to produce a branch from an ancestor state (i.e., from evaluating a substate), which when merged with state *s* results in a state containing 'A'.

Figure 2:
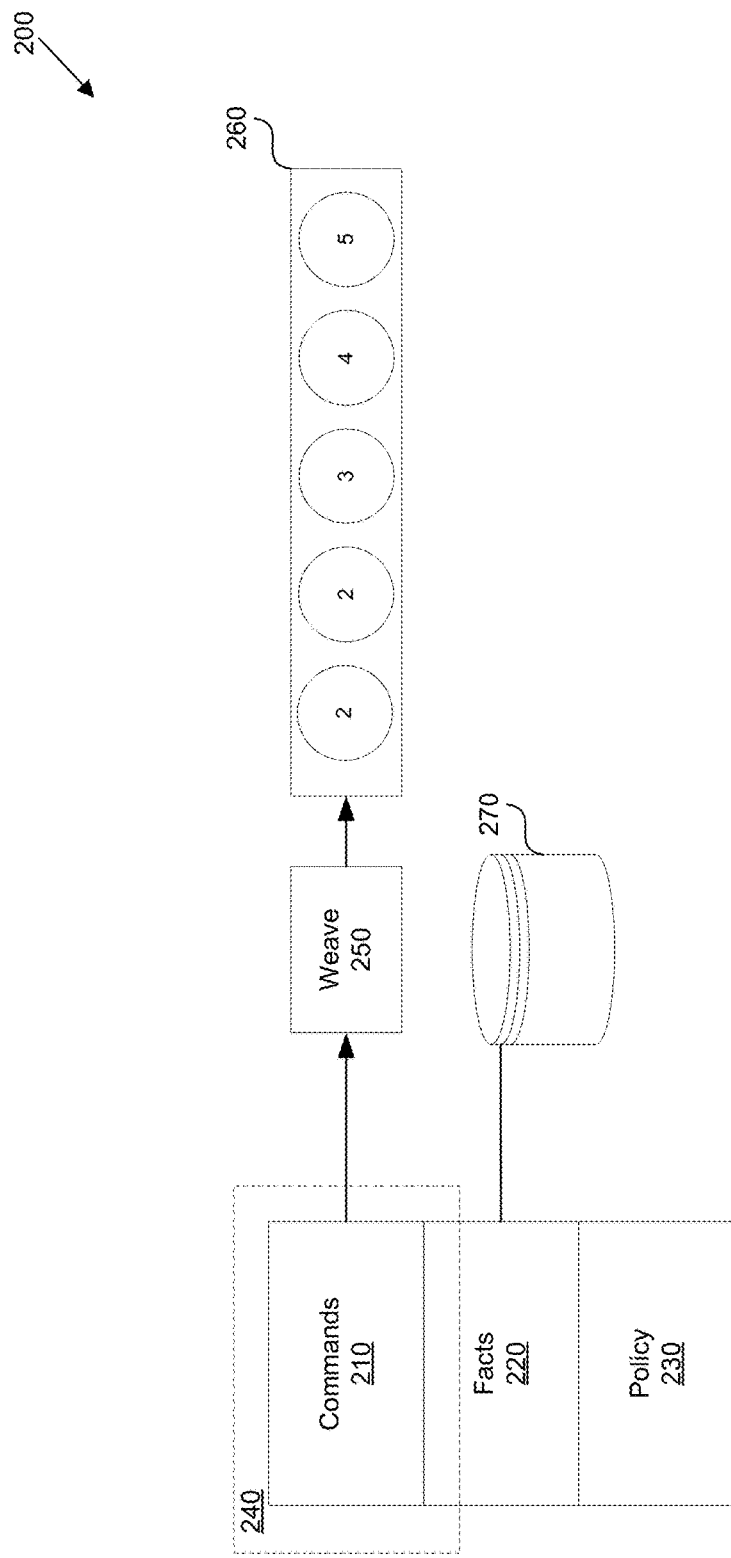
FIG. 2 shows an overview of the system.

FIG. 2 shows an overview of the system 200. The system 200 can include commands 210, facts 220, and policy 230. Commands 210 are a type of message and are the basis of any protocol in the system 200.

Facts 220 are structured key-value pairs that are produced by executing commands. This index of structured key-value pairs is known as the fact database (FactDB) 270. FactDB 270 is a set of triples '<path, key, value>'. Path is a name space, and key and value are tuples. There can be a single value associated with any key in a name space. FactDB 270 can additionally include the command that transitioned the fact database to the current state.

Policy 230 is a set of rules that verify that commands are valid given a FactDB 270. If found to be valid, the policy 230 may mutate the FactDB 270. A fact 'F' is said to be mutated by a command 'A' if and only if the policy that accepts 'A' inserts, updates, or deletes the key or value of 'F'. In other words, policy 230 is a set of rules that describe how an existing set of facts and a command produce a new set of facts:

*policy (command, facts)→facts' *.

These three concepts are combined by repeated evaluation of policy over commands and facts, namely:

facts_0=empty set
facts_1=policy (command_0, facts_0)
facts_2=policy (command_1, facts_1) . . . .
facts_n=policy (command_n-1, facts_n-1)

In addition to evaluating a command over a set of facts, policy can also validate and verify the command. A command is "accepted by the policy" if it is valid, passes verification, and is successfully evaluated with the given set of facts.

Evaluation of policy over a command 'A' and a set of facts produces a new set of facts. Repeated evaluation of policy over each command in the set and the corresponding set of facts that resulted from the previous evaluation produces the final set of facts that represents the indexing of the set of commands. Evaluation of policy over a state *s* produces a collection of facts that indexes the commands in *s *. Transitioning from state *s* to *s+1* occurs by evaluating policy over new command 'C' and the set of facts produced by state *s *. Equivalently, this says that transition occurs by evaluating policy over *s*+'C'. If evaluation fails, then the state could not be transitioned and the command is said to be rejected by the policy. If evaluation succeeds, 'C' is said to be accepted by the policy and the current state is set to *S+1*, which contains 'C'.

A state 240 is a set of commands 210. For example if we had the command instances 'Alpha, Beta' we could construct three states '{Alpha}', '{Beta}', and '{Alpha, Beta}'.

Given a deterministic function that provides a total ordering over any set of commands 210, this approach can be used to build a distributed system that supports eventual consistency. To create eventual consistency, the ordering of the nodes is performed using a weave function 250 that provides deterministic total ordering 260 over commands 210. The weave function 250 is a total ordering of the commands, as described below.

Figure 3:
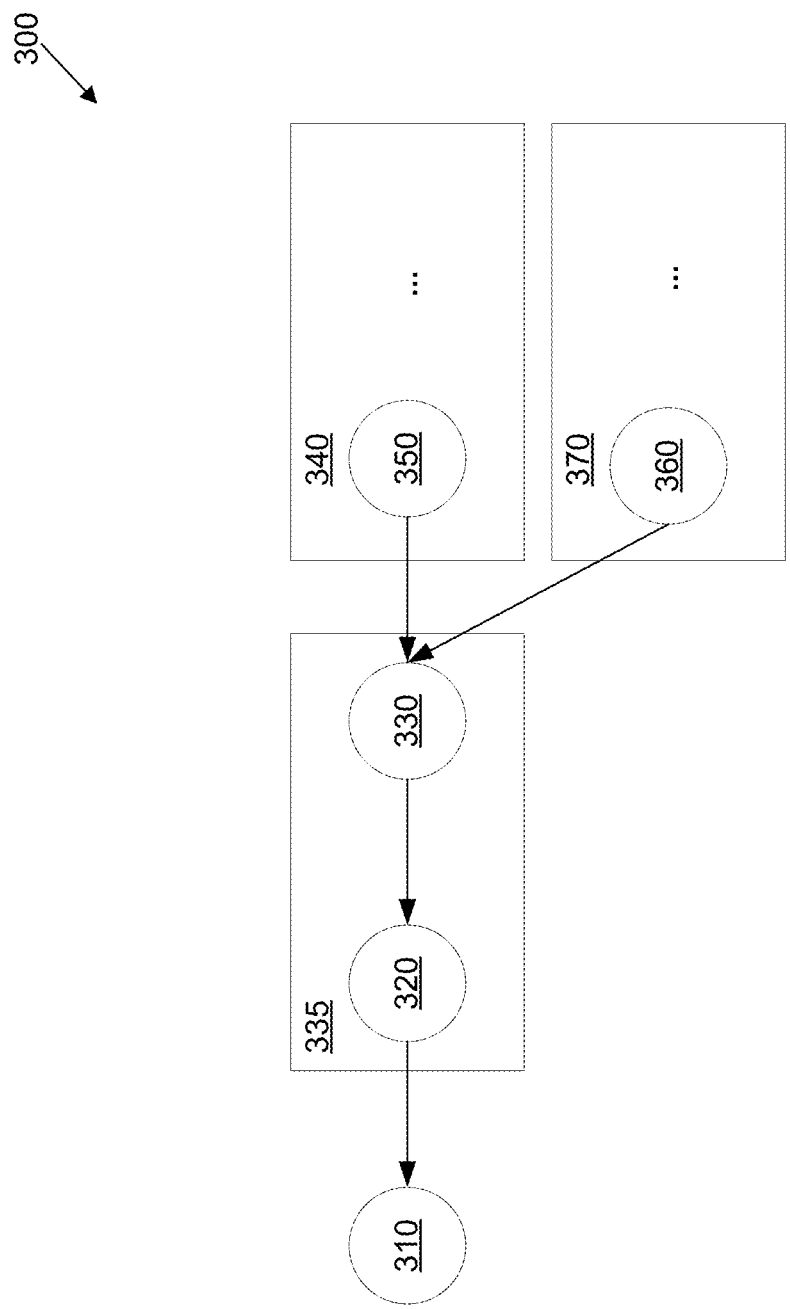
FIG. 3 shows a directed acyclic graph ("graph") representing a partial ordering of commands.

FIG. 3 shows a directed acyclic graph ("graph") 300 representing a partial ordering of commands 210 in FIG. 2. A command 310 is a command among the multiple commands 210. The command 310 can be a message. The command 310 is represented by the node 310 in the graph 300. Each command 310 can have a static list of user fields defined by a schema as well as a common set of base fields such as *id*, *policy*, *group*, *parent*, and *priority *.

The *policy* field specifies which policy rule should be used to process the command. If a command is not valid under policy and the graph 300, the system does not add the command to the graph. For example, if the user that is not authorized to add another user attempts to insert a command in the graph to add another user, the system does not add the command to the graph.

The *group* field can be a 16-byte or more field used to partition commands for use by policy, access controls, and to support partial replication. The *parent* field can include the cryptographic hashes of other commands that have a causal relationship with a given command. Command 310 is a parent of command 320 when commands 320 has command 310 in command to facts 220's *parent* field. There may be 0, 1, or 2 values in the parent field. For example, the command 310 is a parent of the command 320. The *priority* can be a 32-bit unsigned integer value used to order events that do not have a causal relationship.

Command 310 is ancestor of commands 320, 330 because command 310 can be reached from commands 320, 330 by walking the graph 300 of parents from child 320, 330 to parent.

A state 335 is a distinct set of commands, e.g., 320, 330, which all share a single common ancestor. A state 'S' 335 is said to transition to a new state 'S+1' 340 when the policy 230 in FIG. 2 accepts a command 'A' 350 that is not in 'S' 335 by evaluating over command 'A' 350 and the set of facts produced from state 'S' 335.

State 'S+1' 340 may then be the set union of state 'S' 335 and command '{A}' 350, or, if command 'A' 350 is part of a set of commands that are accepted by the policy over 'S'335, then 'S+1' 350 may be the union of 'S' 335 and that set of commands. In other words, state 335 is a set of commands 320, 330 with single common ancestor 310, so going to the next state 340 means adding command(s) 350 to the command set, which occurs when policy 230 receives and approves new commands 350.

Command 'B' 360 is said to depend on command 'A' 350 when neither 'A' nor 'B' are ancestors of each other and the policy rule that accepts 'A' mutates a fact that is read by the policy rule that accepts 'B'.

A command X' is said to be recalled if there is some set of commands 'S1' for which 'X' is accepted in the weave of 'S1', but there is some distinct set 'S2', where 'S2' is a super set of 'S1' and 'X' is not accepted in 'S2'.

If a command 'A' 350 has been finalized in some set of commands 'S' 335, then all the commands that appear in the weave of 'S' 335 prior to 'A' must be ancestors of A".

The head of a set of commands 'S' 335 is the command 330 where all other commands 320 in 'S' are ancestors of the command 330. An implication of this definition is that a set of commands can have only one head, but any set without a head can be broken up into subsets that do have heads.

A set of commands 'S' 335 is an extension of the command 310 when the set of commands 'S' 335 has a head, namely command 330. Command 310 is an ancestor of all commands in 'S' 335. At least one command, namely command 320, in 'S' 335 has command 310 as a parent. No command 320, 330 in 'S' 335 has a parent that is not a member of the set of commands 335 and command 310.

Two sets of commands 340, 370 are branches of the command 330 when sets of commands 340, 370 are extensions of command 330 and there are no commands in the intersection of sets of commands 340, 370. Command 330 can be a branch node. The commands 340, 370 initiating the two branches can occur when a network device, e.g., network devices 140, 130 in FIG. 1, stopped communicating with the remainder of the network devices 110, 120, 150 in FIG. 1.

Figure 4:
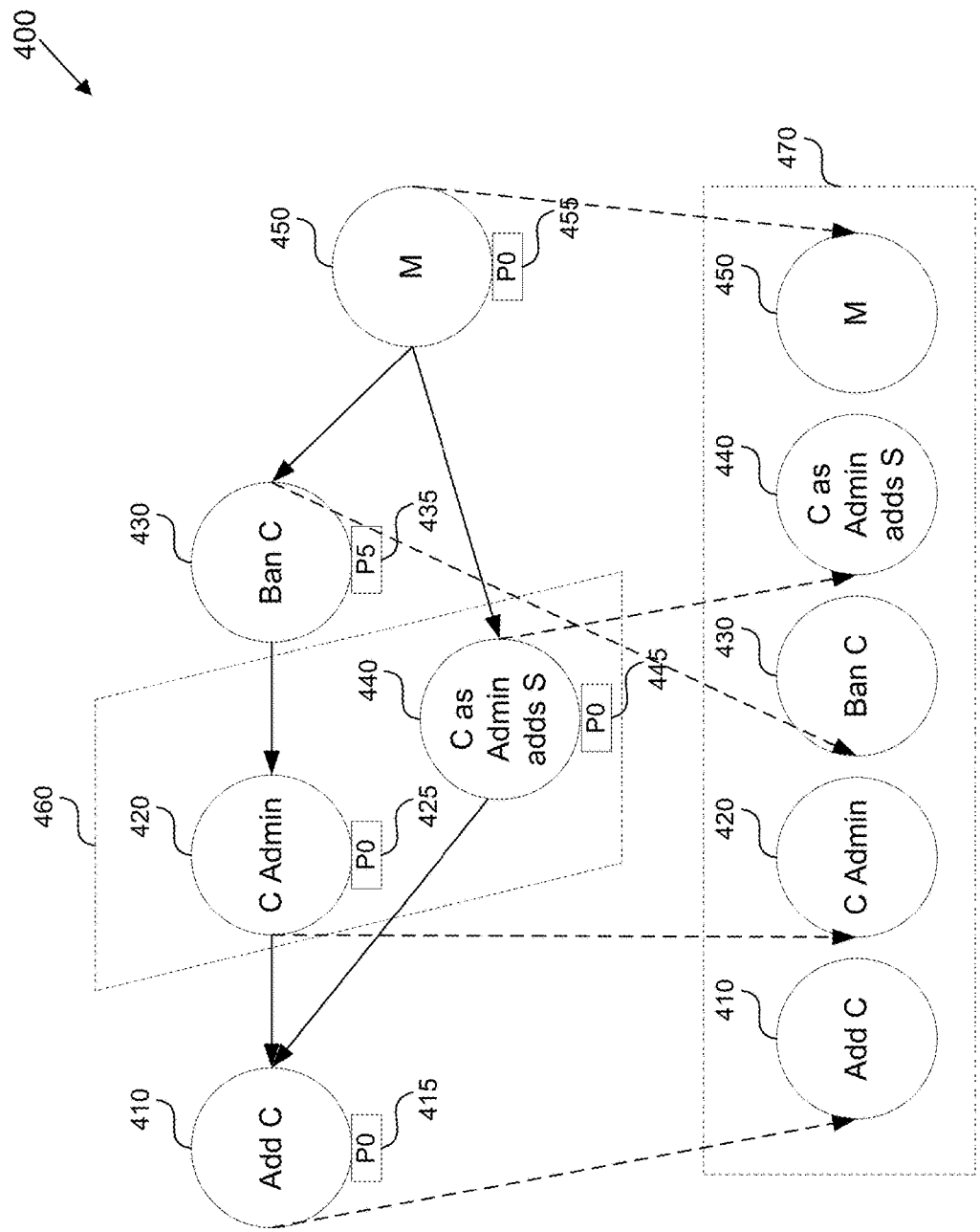
FIG. 4 shows operation of the weave function using causal and priority ordering.

FIG. 4 shows operation of the weave function 250 in FIG. 2 using causal and priority ordering. The weave function 250 provides ordering of the graph 400 even when there are branches in the graph. The weave function 250 can utilize two types of order: causal and priority ordering. The weave function 250 allows implementation of secure decentralized protocols.

In causal order, the parent relationship, e.g., between nodes 430 and 420, defines a causal graph for commands. This "happens before" relationship communicates the intended sequencing of commands from the client that issues them. Causality is honored by a weave function 250. Specifically, the weave function 250 does not order a command 430 before any of the command's ancestors 420, 410. The causal order, though, is insufficient to provide a total order over a set of commands, e.g., when there is branching.

In priority order, when two commands 420, 440 share the same parent 410, this creates a branch 460 in the causal order of the graph 400. The command 410 can be a branch node. Such a branch can be resolved by using a merge command 450 that has more than one parent 430, 440. In this case there is no "happens before" relationship between commands 430, 440 on each side of the branch 460 between the merge command 450 and the first common ancestor 410. Trying to order the commands 420, 430, 440 chronologically is difficult because the commands can be produced by disparate network devices whose local clocks are not synchronized to each other. In addition, establishing a global clock is not desirable because network devices can lose connectivity and can be unable to access the global clock. To provide a total order, the weave function 250 must have a non-causal approach to ordering commands.

For example, as shown in FIG. 4, command 410 can add user Carol. Command 420 can make Carol an administrator. The administrator can have the power to add additional users. Command 430 can ban Carol from adding any further commands to the graph. However, in command 440 Carol adds a new user Sam. Depending on whether the command 440 executes before or after command 430, Sam can be added as a user or not.

In any cycle-free walk from command 410 to command 450, commands visited earlier in the walk happen before commands later in the walk, but the system cannot assign a "happens before" relationship between commands that are not included in the same walk. For example, causally, command 440 cannot be said to have happened before or after command 420, 430.

This lack of ordering across the branches 460 in the graph 400 is a challenge when merging state at command 450. The weave function 250 produces a deterministic total order of commands 410, 420, 430, 440, 450, however, there are several reasonable orderings:

1. command 410, command 420, command 430, command 440, command 450,
2. command 410, command 420, command 440, command 430, command 450,
3. command 410, command 440, command 420, command 430, command 450.

To choose one of the above possible orderings, the weave function 250 applies a method of choosing one weave deterministically so all nodes compute the same order at command 450. Additionally, an adversary, such as Carol, can create the branch 460 to try to add Sam in command 440 before Carol's privileges are revoked in command 430. Defending against this attack would require ordering 1 above.

To achieve a consistent ordering, the weave function 250 provides a way for commands 420, 430, 440, which are not causally related, to have a deterministic order. The system does this by introducing the concept of command priority.

Command priorities 415, 425, 435, 445, 455 can be an unsigned integer value. The weave function 250 orders higher priority commands before lower priority ones unless the lower priority command is an ancestor of the higher priority command.

In an ordering produced by the weave function 250, if command 430 is immediately followed by command 440 and 430 is not the parent of 440, then the priority 435 of command 430 is greater than or equal to the priority 445 of command 440. The one exception to this rule is that finalized commands must occur before all commands that are not their ancestors, as discussed in finalization below. In the case that two commands have the same priority, they will be ordered according to a deterministic function, which can be pseudo random.

Based on the priorities 415, 425, 435, 445, 455, the order of the graph 400 is: command 410, command 420, command 430, command 440, command 450, because the priority 435 of command 430 is P5, higher than the priority 445 of the command 440, which is P0. The resulting weave, or order, 470 produces a desired outcome. In the order 470, the command 440 does not have any effect because in command 430 C has been banned and cannot add new members as required by command 440. Effectively, the command 440 has been recalled, however, the fact that command 440 has been attempted still is shown in the graph, even though command 440 is not executed.

The system assigns the priorities 415, 425, 435, 445, 455 to the commands 410, 420, 430, 440, 450. Commands are not equal; instead, the system 200 create a hierarchy from the commands. Remove commands 430 are higher precedence than add commands 440. In other words, the priorities 415, 425, 435, 445, 455 are assigned to represent the hierarchy. The lower priority command 440 has to happen after the higher priority command 430.

Figure 5:
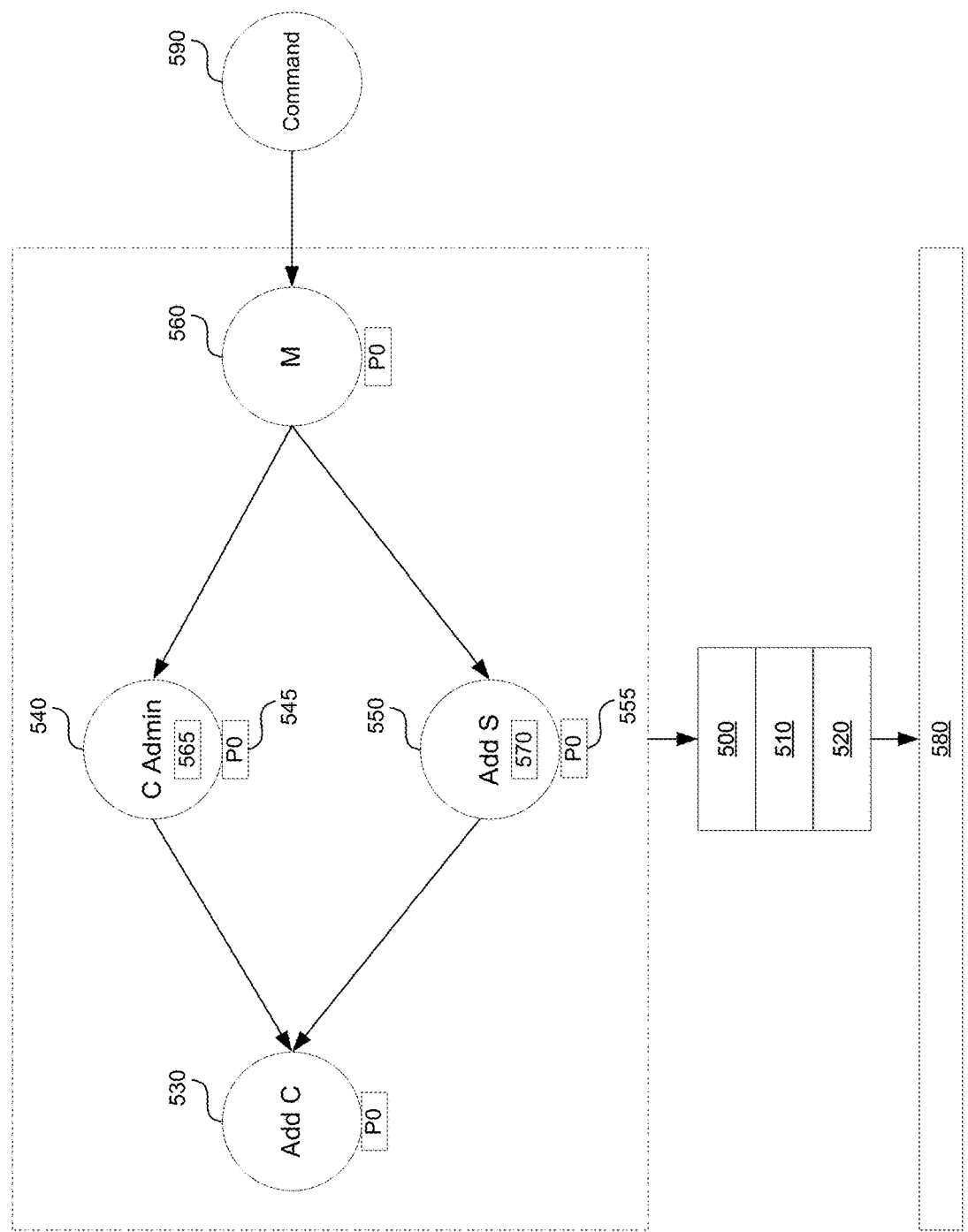
FIG. 5 shows operation of the weave function using identifier (ID) ordering.

FIG. 5 shows operation of the weave function 250 in FIG. 2 using ID ordering. The causal ordering 500 and priority ordering 510, as described above, may not be sufficient in certain circumstances, and an ID ordering 520 may be required. Specifically, if the priority 545 of the command 540 is the same as the priority 555 of the command 550, the weave function 250 in FIG. 2 still can produce two possible orderings:

1. command 530, command 540, command 550, command 560, or
2. command 530, command 550, command 540, command 560.

Consequently, the weave function 250 can apply the ID ordering 520. The ID ordering can rely on the ID 565, 570 of the commands 540, 550 and is a deterministic function. The weave function 250 can order the commands 540, 550 using alphabetical ordering of the IDs 560, 570. The IDs 560, 570 can be a cryptographic hash of the event and that guarantees that two distinct events do not have the same ID. Further, the resulting ID 565, 570 cannot be manipulated to obtain a higher ordering ID. By applying the causal ordering 500, priority ordering 510, and an ID ordering 520, the weave function 250 can produce the deterministic order 580.

When a branch 460 in FIG. 4 occurs in the graph 400 in FIG. 4, a merge command 450 in FIG. 4 can ensure that future commands 590 are ordered after the heads 540, 550 of both branches in the weave 580. The merge command 450 necessarily has two or more parents. The merge command 450 has the lowest possible priority.

The weave function 250 in FIG. 2 ensures that: there is exactly one initialize command in a weave, e.g., node 410 in FIG. 4; all commands 410, 420, 440, 430 in FIG. 4 are part of the weave; and all parents occur before their children.

If node 430 immediately precedes another node 440 in the weave 470 in FIG. 4 and node 430 is not a parent of the node 440, the priority of node 430 must be greater than or equal to the priority of node 440.

If the node 540 in FIG. 5 immediately precedes another node 550 in FIG. 5 in the weave 580 in FIG. 5 and node 540 is not a parent of node 550, and the priorities are equal, then node 540 must have a greater ID than node 550.

An example process to create the weave 470, 580 would be:
1. Find an initialization, e.g. Init, vent and set that to the current event.
2. Iteratively walk from parent to child processing each event and updating the FactDB and adding commands to the weave.
3. If an event has two children, take a snapshot of the FactDB and the weave, storing a pointer to them on a stack. Pick a child and go to step 2.
4. If a merge command is encountered and both parents of the merge have been found, walk backward merging the two branches. Then pop the stack and set the state FactDB to the snapshot. Then reprocess events in the merged order up to the merge event, adding commands to the weave. Go to step 2.
5. If a merge is encountered and the second parent has not been processed, return the FactDB to the state at the head of the stack and continue at step 2 with the unprocessed child events.
6. When no more children can be found but the stack is not empty, return the weave and FactDB from the bottom of the stack. Return all commands not part of the returned weave as orphan commands.

Figure 6:
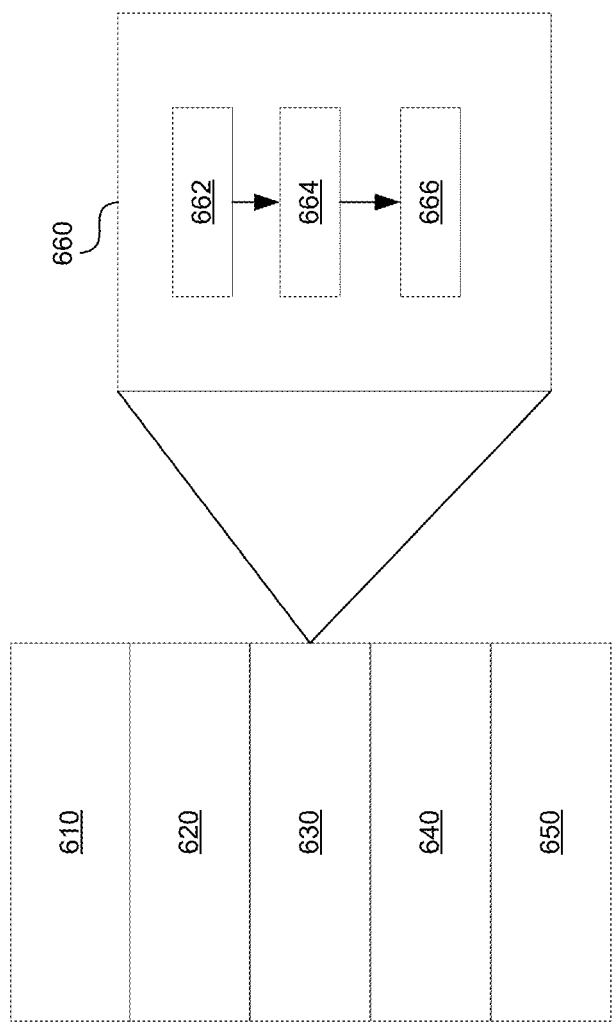
FIG. 6 shows a software stack of the system.

FIG. 6 shows a software stack of the system 200. The stack 600 of the system 200 includes five layers: application semantics 610, service application programmer interface (API) 620, policy 630, ordering 640, and synchronization 650. The ordering 640 layer implements the weave function 250 in FIG. 4 and can define the priority associated with commands. The synchronization 650 layer ensures that the graphs stored at various network devices are communicated to other connected nodes.

The policy 630 layer implements policy as described in this application, such as policy 230 in FIG. 2. The policy 630 does not expose commands; the policy 630 specifies actions and effects that get implemented in terms of commands. In effect, the policy 630 defines the set of commands that produce zero or more effects to accomplish an action. A command produces zero, e.g., no, effects when the command is recalled, as described in this application. In addition, the policy 630 layer can define roles 660 associated with the users of the system 200.

The roles 660 can be hierarchical so that roles higher up on the hierarchy have more authority than the lower roles. For example, the policy 630 can define roles owner 662, admin 664, and user 666. The roles can be hierarchical, with the owner 662 representing the highest level of the hierarchy, the admin 664 representing a middle level of the hierarchy, and user 666 representing the lowest level of the hierarchy. The hierarchy can have two or more levels. Each level 662, 664, 666 of the hierarchy has a certain set of commands available to it. In one embodiment, every role has every command available to it. In another embodiment, the highest level of the hierarchy 662 has all the commands available to it, and the number of available commands reduces by going down in the hierarchy. In some embodiments, the priority of the command can be associated with the role. For example, the same command issued by the owner 662 can have a higher priority than the command issued by the user 666.

In one embodiment, the commands available to a particular level 662, 664, 666 of the hierarchy can affect the same level of the hierarchy or levels down the hierarchy. In other words, an owner 662 can issue commands affecting other owners and herself, as well as commands issuing other administrators and users. In another embodiment, a user at a particular level 662, 664, 666 of the hierarchy can affect the user and users in the hierarchy beneath the user's level. An administrator ("admin") 664 can issue commands affecting other administrators and herself, as well as commands issuing other users. However, an administrator 664 cannot issue commands affecting any of the owners. Similarly, the user can issue commands affecting other users and herself, but not commands issuing administrators and owners.

Figure 7:
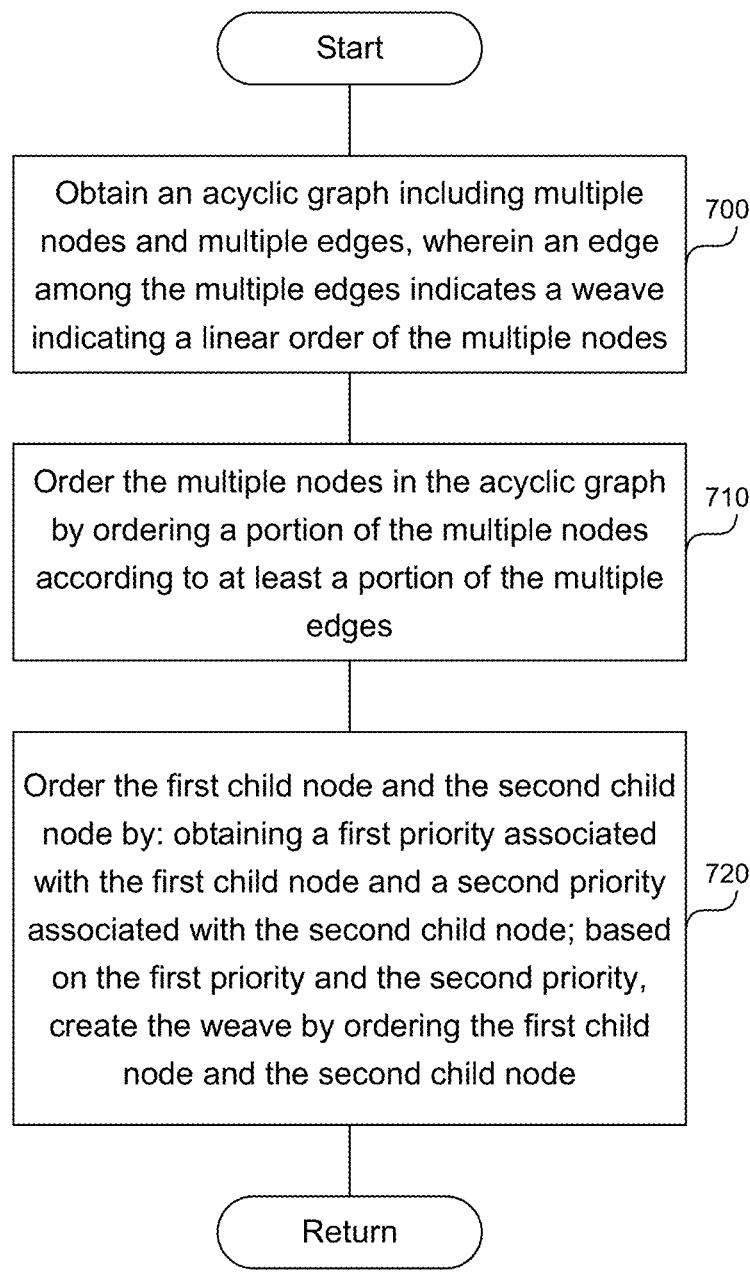
FIG. 7 is a flowchart of a method to deterministically order multiple commands issued by multiple computing devices in a network, when chronological ordering is not possible.

FIG. 7 is a flowchart of a method to deterministically order multiple commands issued by multiple computing devices in a network, when chronological ordering is not possible. A hardware or software processor executing instructions describing this application can in step 700 obtain an acyclic graph, e.g., a directed acyclic graph, including multiple nodes and multiple edges. An edge among the multiple edges indicates a weave including a parent node among the multiple nodes and a child node among the multiple nodes to include in a weave. The weave indicates a linear order of the multiple nodes, where the parent node occurs before the child node. The node in the acyclic graph can represent a command issued by a computing device in the network. The acyclic graph can include a branch node having a first child node and a second child node, where the first child node and the second child node do not have a parent-child relationship indicating the weave.

In step 710, the processor can order the multiple nodes in the acyclic graph by ordering a portion of the multiple nodes according to at least a portion of the multiple edges.

In step 720, the processor can order the first child node and the second child node using the following steps. First, the processor can obtain a first priority associated with the first child node and a second priority associated with the second child node. Based on the first priority and the second priority, create the weave by ordering the first child node and the second child node.

Specifically, in one embodiment, to order the first child node and the second child node, the processor can obtain a first sequence of nodes emanating from the branch node, where the first sequence of nodes includes the first child. The processor can obtain a second sequence of nodes emanating from the branch node, where the second sequence of nodes includes the second child and where the first sequence of nodes and the second sequence of nodes do not have a second weave, or, in other words, are not ordered. The processor can obtain the last node in the first sequence of nodes and the last node in the second sequence of nodes. The processor can obtain a third priority of the last node in the first sequence of nodes and a fourth priority of the last node in the second sequence of nodes. The processor can determine whether the third priority is higher than the fourth priority by comparing the third priority and the fourth priority. Upon determining that the third priority is higher than the fourth priority, the processor can add the last node in the second sequence of nodes as a last node of the second weave. The processor can obtain a penultimate node in the second sequence of nodes and a fifth priority associated of the penultimate node. The processor can determine whether the third priority is higher than the fifth priority by comparing the third priority and the fifth priority. Upon determining that the third priority is higher than the fifth priority, the processor can add the penultimate node in the second sequence of nodes as a penultimate node of the second weave.

In another embodiment, to order the first child node and the second child node when the priorities of the first child node and the second child node are the same, the processor can use the unique identifier of the nodes. Specifically, the processor can determine whether the first priority matches the second priority by comparing the first priority and the fourth priority. Upon determining the first priority matches the second priority, the processor can obtain a first unique identifier associated with the first child node and a second unique identifier associated with the second node. The unique IDs 560, 570 can be cryptographic hashes of the content of the nodes. The cryptographic hash guarantees that two distinct events do not have the same ID. The processor can create the weave by ordering the first child node and the second child node based on the ordering of the first unique identifier and the second unique identifier. The ordering can be alphabetical ordering.

The processor can define priorities based on type of nodes or commands represented by the nodes. The processor can obtain a first type associated with the first node and a second type associated with the second node. Based on the first type and the second type, the processor can determine the first priority associated with the first node and the second priority associated with the second node. A priority associated with a remove node is higher than a priority associated with an add node.

The processor can determine whether a node representing a command can be issued by the user based on a role associated with the user. The processor can obtain a role among multiple roles associated with a first user, where the role indicates a subset of nodes representing commands that the role can issue. The processor can obtain a first node issued by the first user. The processor can determine whether the first node is valid based on the following two steps. First, the processor can determine whether the first node issued by the first user belongs to the subset of nodes that the role associated with the first user can issue. Second, upon determining that the first node issued by the first user belongs to the subset of nodes that the role associated with the first user can issue, the processor can determine that the first node is valid.

The roles can be hierarchical. The processor can obtain a first role among multiple roles associated with a first user, where the multiple roles are arranged in hierarchical levels. Each role can issue commands affecting roles further down in the hierarchy or affecting the user of the role. Alternatively, the role can issue commands affecting other users having roles at the same level. The first role can indicate a subset of nodes that the first role can issue. The processor can obtain a first node issued by the first user and a second user affected by the first node. The processor can determine whether the first node is valid by performing the following steps. First, the processor can determine whether the first node issued by the first user belongs to the subset of nodes that the first role associated with the first user can issue. Second, the processor can obtain a second role associated with the second user, a second hierarchical level associated with the second role, and a first hierarchical level associated with the first role. Third, the processor can determine whether a first hierarchical level among the hierarchical levels is the same as or higher than the second hierarchical level. Upon determining the first node belongs to the subset of nodes and determining that the first hierarchical level among the hierarchical levels is the same as or higher than the second hierarchical level, the processor can determine that the first node is valid. Otherwise, the processor can determine that the first node is not valid.

To order the first child node and the second child node, e.g., to create the weave, the processor can weave the nodes from the last node to the first. Specifically, the processor can obtain a first sequence of nodes emanating from the branch node, where the first sequence of nodes includes the first child. The processor can obtain a second sequence of nodes emanating from the branch node, where the second sequence of nodes includes the second child, and where the first sequence of nodes and the second sequence of nodes do not have a second weave. The processor can obtain a first sequence of priorities associated with the first sequence of nodes and a second sequence of priorities associated with the second sequence of nodes. Beginning at the last node associated with the first sequence of nodes and the last node associated with the second sequence of nodes, the processor can iteratively perform the following three steps, until the first sequence of nodes in the second sequence of nodes are ordered in the weave. First, the processor can visit a last node in the first sequence of nodes that is not added to the weave and a last node the second sequence of nodes that is not added to the weave. Second, the processor can compare a priority of the last node in the first sequence of nodes that is not added to the weave and a priority of the last node in the second sequence of nodes that is not added to the weave to obtain a node with a lower priority. Third, the processor can add the node with the lower priority to the weave.

Fixing a Changing Weave Using a Finalize Node

Figure 8:
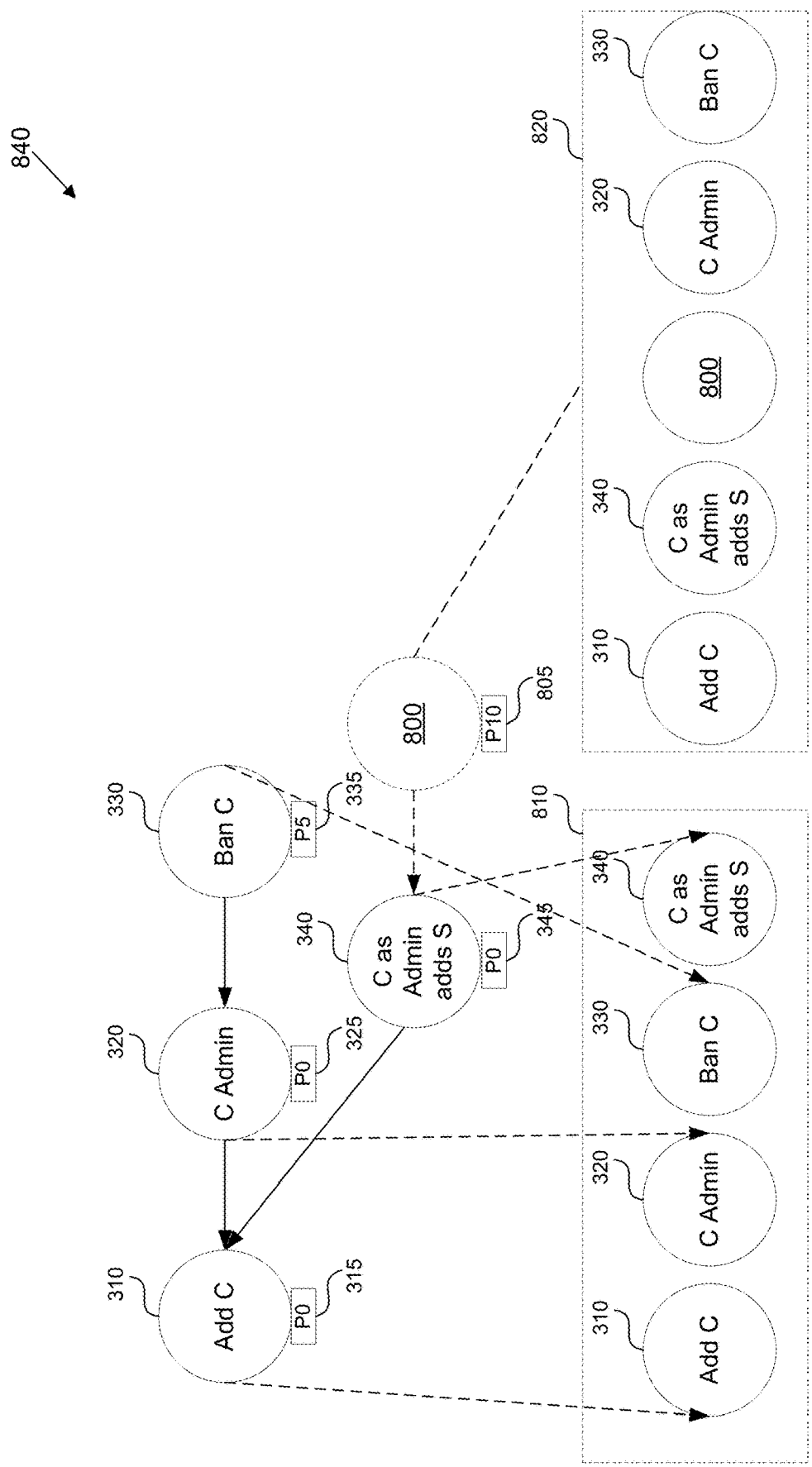
FIG. 8 shows a changing weave when new commands are added.

FIG. 8 shows a changing weave 810, 820 when new commands 800 are added. The system described in this application produces a deterministic weave 810, 820, meaning that every node evaluating the graph 840 produces the same weave. However, the weave 810 can change with the addition of new nodes 800, especially when the new node 800 has a high priority 805.

The system generates the weave 810 based on the child-parent relationships and priorities 415, 425, 435, 445. The weave 810 is deterministic. However, when the new node 800 is added with a priority 805 of P10, the weave 810 changes into the weave 820, because command 330 now has lower priority than command 800 and command 320 has lower priority than command 800. Consequently, the end result is the that the node 340 is valid in the weave 820. To prevent such varying outcomes, a finalize node is introduced.

Figure 9:
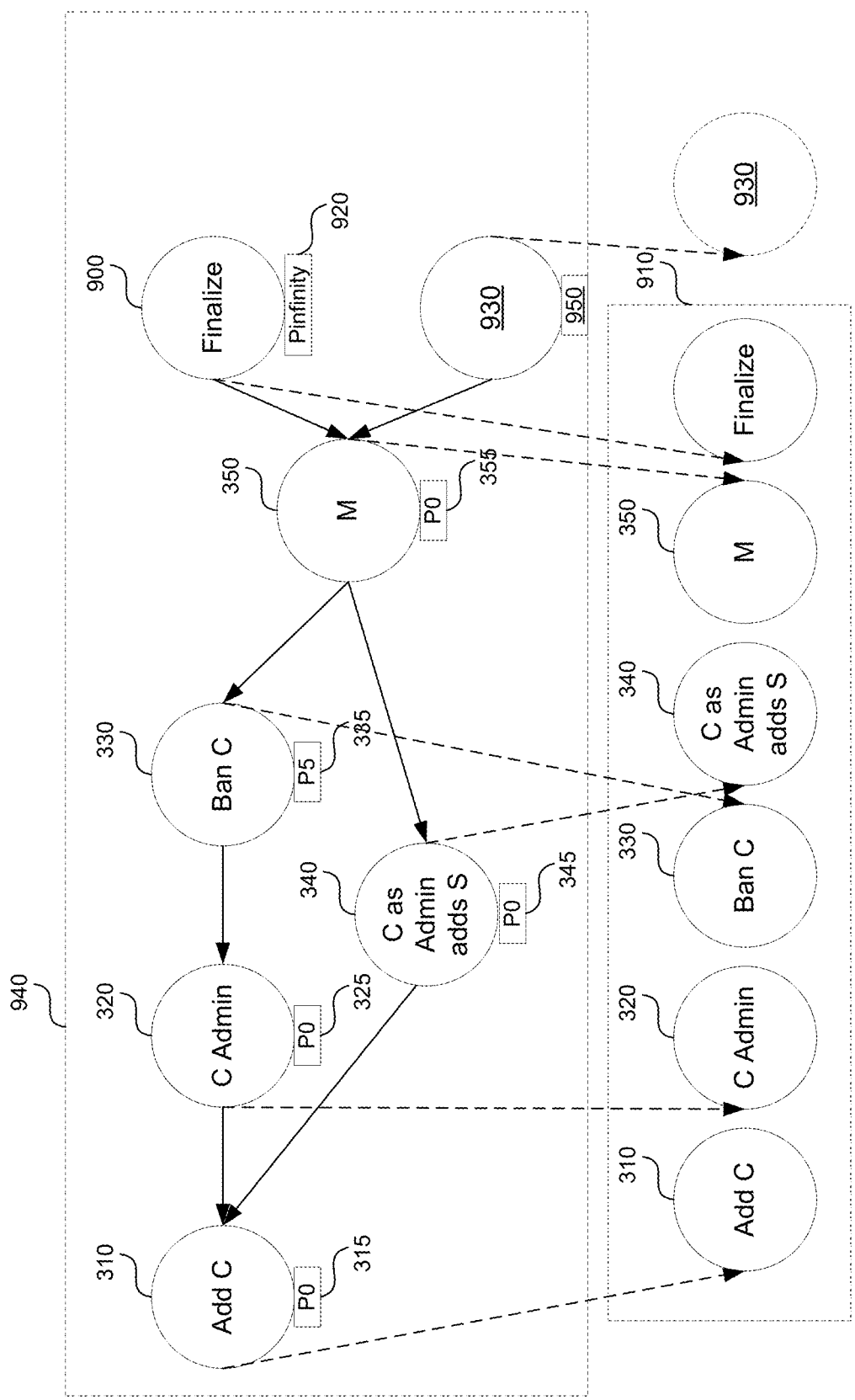
FIG. 9 shows a finalize node.

FIG. 9 shows a finalize node. The finalize node 900 occurs when all the network devices 110, 120, 130, 140, 150 in FIG. 1 reach a global consensus. The system can reach the global consensus using varying algorithms such as asynchronous BFT algorithm or an autocratic consensus algorithm. In the autocratic consensus algorithm, single network device e.g., network device 110 in FIG. 1, can be authorized to issue finalize nodes. As long as the authorized network device 110 has access to the graph, the finalize nodes can be issued.

The ordering of the nodes 310, 320, 330, 340, 350 can change until the finalization command 900. After the finalize node 900, the weave 910 of the nodes 310, 320, 330, 340, 350 is stable.

To protect the weave 910 and ensure that the order in the weave 910 does not change, the finalize node 900 has the highest priority 920 of all the nodes, e.g., priority of infinity. The priority 920 of the finalize node 900 has the effect that all commands 930 that are not ancestors of the finalization command must happen after the finalize node 900 in the weave 910.

The finalize node 900 can have two types of fields: order and facts. Both are of the type Merkle root, which is the root element of a Merkle tree. The order field is the Merkle tree that represents the finalized weave 910. The facts field is the root of a Merkle tree for the finalized FactDB.

In the weave 910, the finalize node 900 occurs after all its ancestors 310, 320, 330, 340, 350, and before all commands 930 that are not its ancestors. This implies that the effects of ancestors 310, 320, 330, 340, 350 of a finalize node 900 are never recalled. Since the weave 910 after the finalize node 900 is guaranteed not to change, the graph 940 can be truncated at the finalize node 900. Any new network devices joining the system 100 in FIG. 1 after the issuance of the finalize node 900 can obtain the state of the graph 940 at the finalize node 900 instead of having to obtain all the nodes from the initialization of the graph 940. Therefore, onboarding of new network devices after the finalize node is more efficient.

To perform a weave function 250 in FIG. 2 on the graph 940, the priority 950 of the node 930 is compared to the priority 920 of the finalize node 900. Since the priority 950 is always lower than the priority 920 of the finalize node 900, the node 930 necessarily comes after the finalize node 900. Consequently, the weave 910 is obtained that can be followed by node 930.

Figure 10:
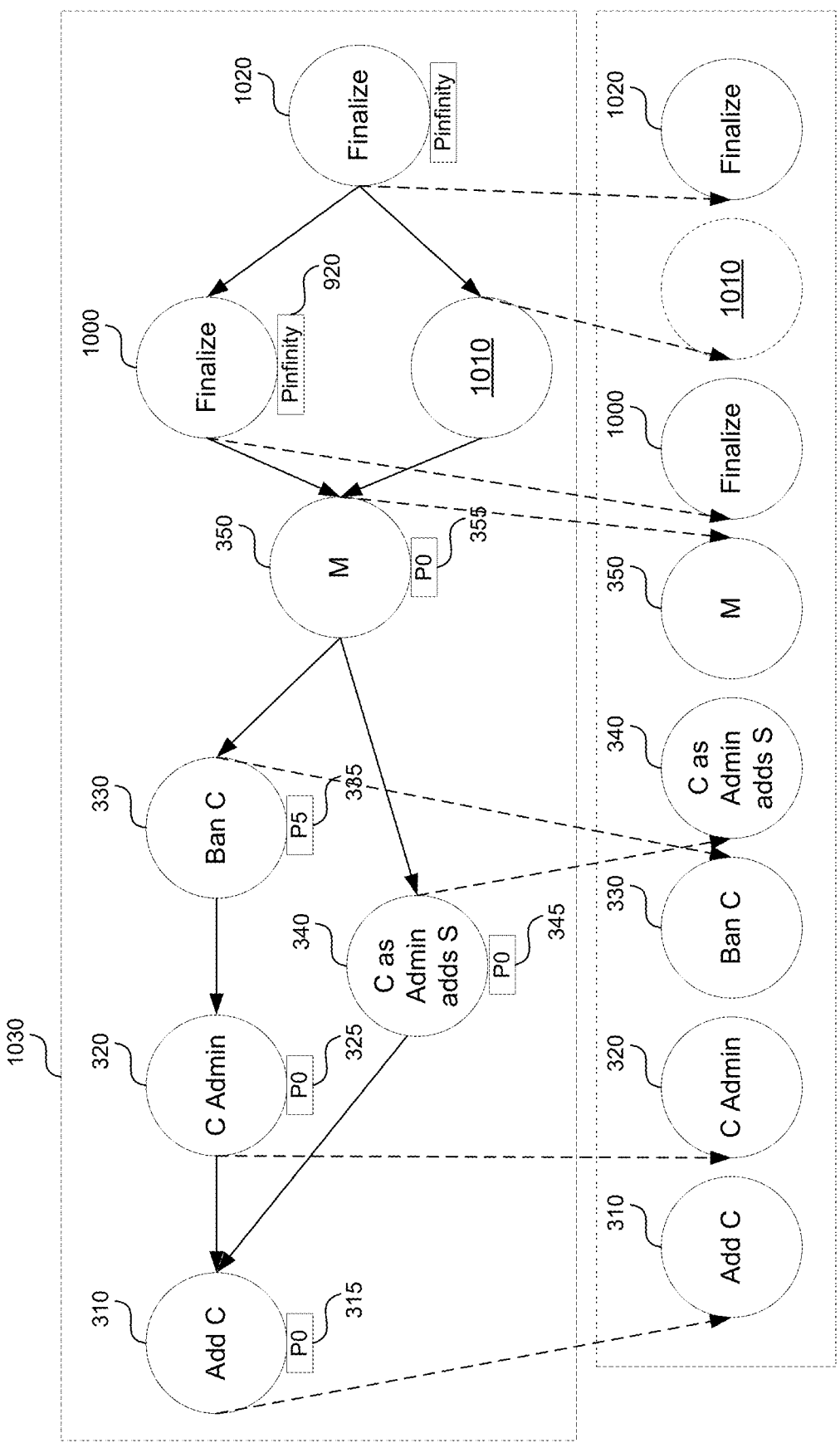
FIG. 10 shows a weave of a graph containing multiple finalize nodes.

FIG. 10 shows a weave of a graph containing multiple finalize nodes. As explained in this application, a finalize command 1000 can be issued only once there is global consensus. Consequently, the command 1010 cannot be a finalize node because it is being issued on a single branch, meaning that not all network devices 110, 120, 130, 140, 150 in FIG. 1 are available to reach a global consensus, among the consensus set. In other words, the finalize node 1000 cannot be assigned to a branch in the graph 1030.

A graph 1030 can have two or more finalize nodes 1000, 1020. For all finalize nodes 1000, 1020 that occur in a graph 1030, one finalize node 1000 must be an ancestor of the other finalize node 1020. In other words, there is a single walk through the graph 1030 that visits every finalize node 1000, 1020.

Figure 11:
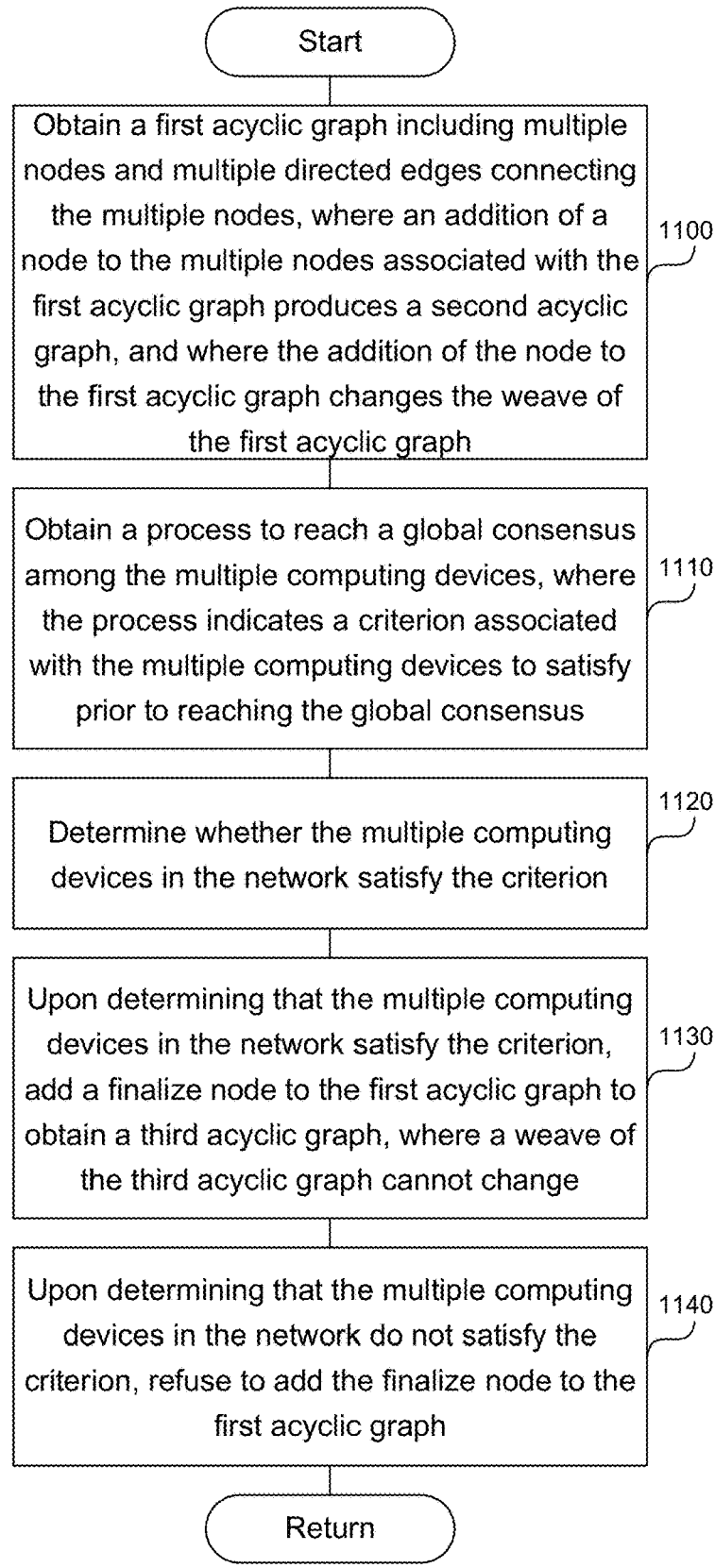
FIG. 11 is a flowchart of a method to fix a changing weave using a finalization node.

FIG. 11 is a flowchart of a method to fix a changing weave using a finalization node. A hardware or software processor executing instructions describing this application can in step 1100 obtain a first acyclic graph, e.g., a directed acyclic graph, including multiple nodes and multiple directed edges connecting the multiple nodes, where a process to create a weave of the first acyclic graph produces a matching weave when executed on the first acyclic graph by two different computing devices among the multiple computing devices. The weave indicates a linear order of the multiple nodes. An addition of a node to the multiple nodes associated with the first acyclic graph produces a second acyclic graph. The addition of the node to the first acyclic graph changes the weave of the first acyclic graph.

In step 1110, the processor can obtain a process to reach a global consensus among the multiple computing devices, where the process indicates a criterion associated with the multiple computing devices to satisfy prior to reaching the global consensus. The criterion can be autocratic consensus, unanimous consensus, asynchronous BFT consensus, etc.

In step 1120, the processor can determine whether the multiple computing devices in the network satisfy the criterion.

In step 1130, upon determining that the multiple computing devices in the network satisfy the criterion, the processor can add a finalize node to the first acyclic graph to obtain a third acyclic graph. The finalize node can be a node including the finalize command. After the addition of the finalize node, the weave of the third directed acyclic graph cannot change, e.g., the weave is fixed.

Upon determining that the multiple computing devices in the network do not satisfy the criterion, in step 1140, the processor can refuse to add the finalize node to the first acyclic graph.

The processor can use priorities assigned to nodes to create the weave. Specifically, the processor can obtain the first acyclic graph including multiple nodes and multiple edges. An edge among the multiple edges indicates the weave of the first acyclic graph including indicating a parent node among the multiple nodes and a child node among the multiple nodes. The parent node occurs before the child node in the weave. The first acyclic graph includes a branch node having a first child node and a second child node, where the first child node and the second child node do not have a parent-child relationship indicating the weave. The first child node can include the finalize node. The processor can order the multiple nodes in the acyclic graph by ordering a portion of the multiple nodes according to at least a portion of the multiple edges. Further, the processor can order the first child node and the second child node by performing the following three steps. First, the processor can obtain a first priority associated with the finalize node represented by the first child node and a second priority associated with the second child node, where the first priority associated with the finalize node is higher than a priority associated with a node that is not the finalize node. Second, the processor can determine that the first priority is higher than the second priority. Third, the processor can create the weave by ordering the first node before the second node in the weave.

The processor can ensure that for every pair of finalize nodes one finalize node is an ancestor of the other. Specifically, the processor can receive a request to add a second finalize node to the third acyclic graph. The processor can determine whether, when the second finalize node is added to the third acyclic graph, the node including the finalize node is an ancestor of the second finalize node. Upon determining that the node including the finalize node is not an ancestor of the second finalize node, the processor can refuse to add to the second finalize node to the third acyclic graph.

The processor can determine whether to add a command to the acyclic graph, by evaluating whether the command is allowed based on policy. Specifically, the processor can receive a request to add a second node including a second command to the third acyclic graph, where the request indicates a user making the request. The processor can obtain a first state associated with the third acyclic graph after executing the finalize node, where the first state indicates a first multiplicity of commands associated with the user immediately after executing the finalize node. By obtaining the first state, the processor avoids having to evaluate the whole third acyclic graph from the initialize node to the end, thereby saving processing cycles, memory, and time. Instead, the processor obtains the first state at the finalize node, because the first state will not change after the finalize node. The processor can determine a second state associated with the third acyclic graph by evaluating the third directed acyclic graph from the first state to the last node in the third acyclic graph, where the second state indicates a second multiplicity of commands associated with the user after executing the last node in the third acyclic graph. Based on the second state, the processor can determine whether the second command is included in the second multiplicity of commands. Upon determining that the second command is not included in the second multiplicity of commands, the processor can refuse to add the second command to the third acyclic graph.

After recalling a node, the processor can issue a finalize node to protect weave of the nodes that are ancestors of the finalize node. Specifically, the processor can obtain the weave of the first acyclic graph, where each node in the weave indicates the node and a user associated with the node. The processor can evaluate whether the user associated with the node has a permission to issue the node. Upon determining that the user associated with the node does not have the permission to issue the node, the processor can refuse to execute the node. In other words, the processor recalls the nodes, but leaves the node in the weave. The processor can prevent the node from being executed by protecting the weave and issuing the finalize node.

The processor can use finalize nodes to efficiently onboard new computing devices. The processor can receive a request from a second computing device to join the network. The processor can reduce bandwidth consumption by performing the following two steps. First, the processor can obtain a fourth acyclic graph, where the fourth acyclic graph includes the third acyclic graph and one or more nodes following the finalize node. Second, the processor can send to the second computing device a state of the fourth acyclic graph at the finalize node, and the node following the finalize node, without sending to the second computing device ancestors of the finalize node.

The processor can create the weave of the third acyclic graph. The processor can order multiple nodes associated with a third acyclic graph according to ancestry indicated by multiple edges associated with the third acyclic graph. When the multiple edges associated with the third acyclic graph indicate ambiguous ancestry, the processor can order the multiple nodes associated with the third acyclic graph according to multiple priorities associated with multiple nodes having ambiguous ancestry. The processor can ensure that the weave of the third acyclic graph cannot change by assigning the highest priority to the finalize node.

Computer System

Figure 12:
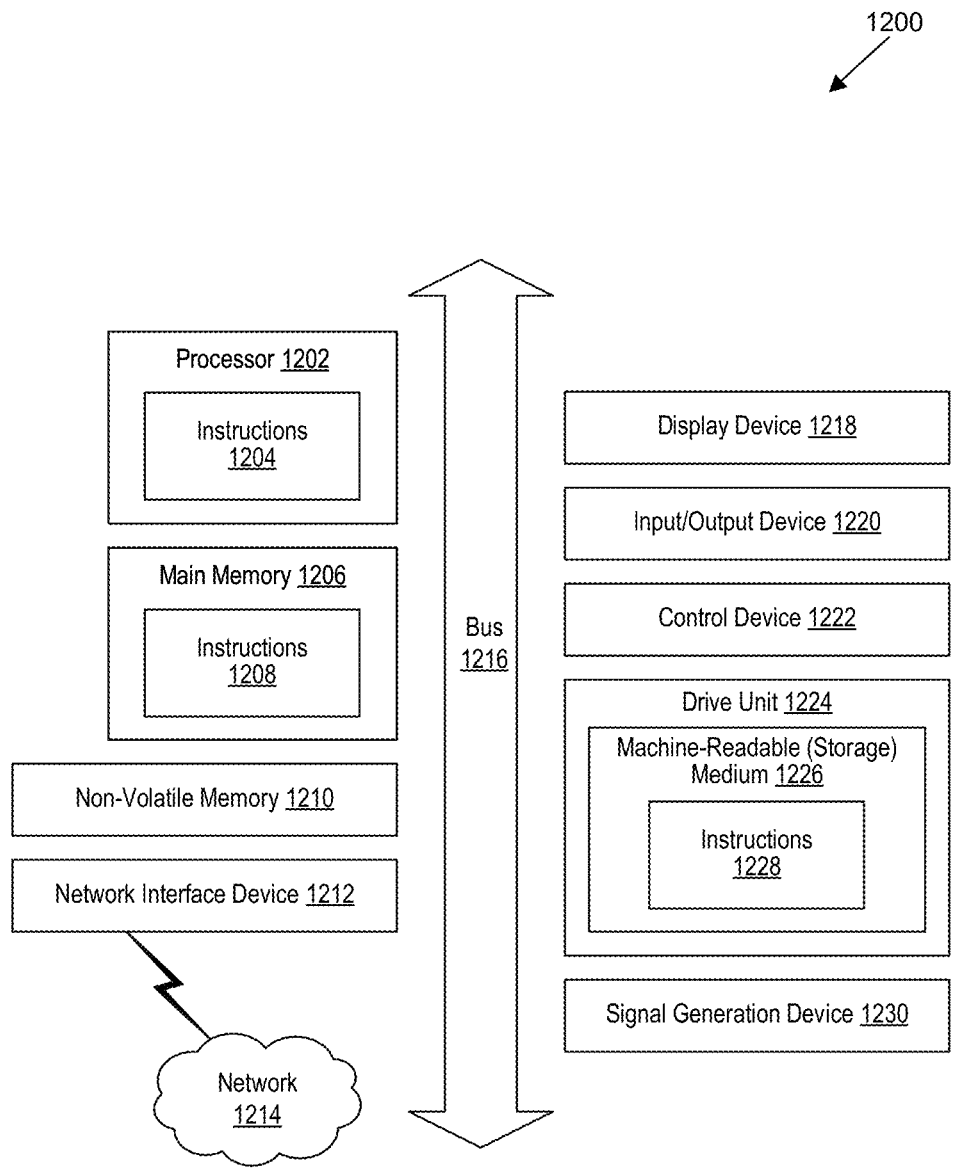
FIG. 12 is a block diagram that illustrates an example of a computer system 1200 in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, video display device 1218, an input/output device 1220, a control device 1222 (e.g., keyboard and pointing device), a drive unit 1224 that includes a storage medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer (SBC) system, or a distributed system such as a mesh of computer systems or include one or more cloud components in one or more networks. Where appropriate, one or more computer systems 1200 can perform operations in real time, near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable (storage) medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions that,
   when executed by at least one processor of a system, cause the system to:
   obtain a first directed acyclic graph including multiple nodes and multiple edges connecting the multiple nodes,
      wherein a node in the first directed acyclic graph represents a command issued by a computing device among multiple computing devices,
      wherein a process to create a linear order of the multiple nodes associated with the first directed acyclic graph produces a matching linear order when executed on the first directed acyclic graph by two different computing devices among the multiple computing devices,
      wherein an addition of the node to the multiple nodes associated with the first directed acyclic graph changes the linear order of the multiple nodes associated with the first directed acyclic graph;
   obtain an indication to stop changing the linear order of the multiple nodes associated with the first directed acyclic graph; and
   upon obtaining the indication to stop changing the linear order of the multiple nodes associated with the first directed acyclic graph, add a finalize command to the first directed acyclic graph to obtain a second directed acyclic graph,
      wherein upon adding the finalize command to the first directed acyclic graph, the addition of the node to the second directed acyclic graph does not change the linear order of the multiple nodes associated with the first directed acyclic graph.

2. The non-transitory, computer-readable storage medium of claim 1, comprising instructions to:
   obtain the first directed acyclic graph including the multiple nodes and the multiple edges,
      wherein an edge among the multiple edges indicates the linear order of the first directed acyclic graph including indicating a parent node among the multiple nodes and a child node among the multiple nodes,
      wherein the parent node occurs before the child node in the linear order,
      wherein the first directed acyclic graph includes a branch node having a first child node and a second child node,
         wherein the first child node and the second child node do not have a parent-child relationship indicating the linear order, and
         wherein the first child node includes the finalize command;
   order the multiple nodes in the first directed acyclic graph by ordering a portion of the multiple nodes according to at least a portion of the multiple edges; and
   order the first child node and the second child node by:
      obtaining a first priority associated with the finalize command represented by the first child node and a second priority associated with a second command represented by the second child node,
         wherein the first priority associated with the finalize command is higher than a priority associated with a command that is not the finalize command;
      determining that the first priority is higher than the second priority; and
      creating the linear order by ordering the finalize command before the second command in the linear order.

3. The non-transitory, computer-readable storage medium of claim 1, comprising instructions to:
   receive a request to add a second node including a second finalize command to the second directed acyclic graph;
   determine whether, when the second node including the second finalize command is added to the second directed acyclic graph, the node including the finalize command is an ancestor of the second node including the second finalize command; and
   upon determining that the node including the finalize command is not an ancestor of the second node including the second finalize command, refuse to add the second node including the second finalize command to the second directed acyclic graph.

4. The non-transitory, computer-readable storage medium of claim 1, comprising instructions to:
   receive a request to add a second node including a second command to the second directed acyclic graph,
      wherein the request indicates a user making the request;
   obtain a first state associated with the second directed acyclic graph after executing the finalize command,
      wherein the first state indicates a first multiplicity of commands associated with the user after executing the finalize command;
   determine a second state associated with the second directed acyclic graph by evaluating the second directed acyclic graph from the first state to the last node in the second directed acyclic graph,
      wherein the second state indicates a second multiplicity of commands associated with the user after executing the last node in the second directed acyclic graph;
   based on the second state, determine whether the second command is included in the second multiplicity of commands; and
   upon determining that the second command is not included in the second multiplicity of commands, refuse to add the second command to the second directed acyclic graph.

5. The non-transitory, computer-readable storage medium of claim 1, comprising instructions to:
obtain the linear order of the first directed acyclic graph, wherein each node in the linear order indicates the command and a user associated with the command;
evaluate whether the user associated with the command has a permission to issue the command;
upon determining that the user associated with the command does not have the permission to issue the command, refuse to execute the command; and
prevent the command from being executed by protecting the linear order and issuing the finalize command.

6. The non-transitory, computer-readable storage medium of claim 1, comprising instructions to:
receive a request from a second computing device to join the multiple computing devices;
reduce bandwidth consumption by:
obtaining a fourth directed acyclic graph,
wherein the fourth directed acyclic graph includes the second directed acyclic graph and a node following the finalize command; and
sending to the second computing device a state of the fourth directed acyclic graph at the finalize command and the node following the finalize command, without sending to the second computing device an ancestor of the finalize command.

7. The non-transitory, computer-readable storage medium of claim 1, comprising instructions to:
create the linear order of the second directed acyclic graph by:
ordering multiple nodes associated with the second directed acyclic graph according to ancestry indicated by multiple edges associated with the second directed acyclic graph;
when the multiple edges associated with the second directed acyclic graph indicate ambiguous ancestry of the multiple nodes associated with the second directed acyclic graph, ordering the multiple nodes associated with the second directed acyclic graph according to multiple priorities associated with the multiple nodes having ambiguous ancestry; and
ensuring that the linear order of the second directed acyclic graph cannot change by assigning the highest priority to the finalize command.

8. A method comprising:
obtaining a first graph including multiple nodes and multiple edges connecting the multiple nodes,
wherein a node in the first graph represents a command issued by a computing device among multiple computing devices,
wherein a process to create a linear order of the multiple nodes associated with the first graph produces a matching linear order when executed on the first graph by two different computing devices among the multiple computing devices,
wherein an addition of the node to the multiple nodes associated with the first graph changes the linear order of the multiple nodes associated with the first graph;
obtaining an indication to stop changing the linear order of the multiple nodes associated with the first graph; and
upon obtaining the indication to stop changing the linear order of the multiple nodes associated with the first graph, adding a finalize node to the first graph to obtain a second graph,
wherein upon adding the finalize node to the first graph, the addition of the node to the second graph does not change the linear order of the multiple nodes associated with the first graph.

9. The method of claim 8, comprising:
obtaining the first graph including the multiple nodes and the multiple edges,
wherein an edge among the multiple edges indicates the linear order of the first graph including indicating a parent node among the multiple nodes and a child node among the multiple nodes,
wherein the parent node occurs before the child node in the linear order,
wherein the first graph includes a branch node having a first child node and a second child node,
wherein the first child node and the second child node do not have a parent-child relationship indicating the linear order, and
wherein the first child node includes the finalize node;
ordering the multiple nodes in the first graph by ordering a portion of the multiple nodes according to at least a portion of the multiple edges; and
ordering the first child node and the second child node by:
obtaining a first priority associated with the finalize node represented by the first child node and a second priority associated with the second child node,
wherein the first priority associated with the finalize node is higher than a priority associated with a node that is not the finalize node;
determining that the first priority is higher than the second priority; and
creating the linear order by ordering the first child node before the second child node in the linear order.

10. The method of claim 8, comprising:
receiving a request to add a second node including a second finalize node to the second graph;
determining whether, when the second node including the second finalize node is added to the second graph, the node including the finalize node is an ancestor of the second finalize node; and
upon determining that the node including the finalize node is not an ancestor of the second finalize node, refusing to add the second finalize node to the second graph.

11. The method of claim 8, comprising:
receiving a request to add a second node including a second command to the second graph,
wherein the request indicates a user making the request;
obtaining a first state associated with the second graph after executing the finalize node,
wherein the first state indicates a first multiplicity of commands associated with the user after executing the finalize node;
determining a second state associated with the second graph by evaluating the second graph from the first state to the last node in the second graph,
wherein the second state indicates a second multiplicity of commands associated with the user after executing the last node in the second graph;
based on the second state, determining whether the second command is included in the second multiplicity of commands; and
upon determining that the second command is not included in the second multiplicity of commands, refusing to add the second command to the second graph.

12. The method of claim 8, comprising:
receiving a request from a second computing device to join the multiple devices; and
reducing bandwidth consumption by:
  obtaining a fourth graph,
    wherein the fourth graph includes the second graph and a node following the finalize node; and
  sending to the second computing device a state of the fourth graph at the finalize node and the node following the finalize node, without sending to the second computing device an ancestor of the finalize node.

13. The method of claim 8, comprising:
creating the linear order of the second graph by:
  ordering multiple nodes associated with the second graph according to ancestry indicated by multiple edges associated with the second graph;
  when the multiple edges associated with the second graph indicate ambiguous ancestry of the multiple nodes associated with the second graph, ordering the multiple nodes associated with the second graph according to multiple priorities associated with the multiple nodes having ambiguous ancestry; and
  ensuring that the linear order of the second graph cannot change by assigning the highest priority to the finalize node.

14. A system comprising:
at least one hardware processor; and
at least one non-transitory memory storing instructions, which, when executed by the at least one hardware processor, cause the system to:
  obtain a first graph including multiple nodes and multiple edges connecting the multiple nodes,
    wherein a node in the first graph represents a command issued by a computing device among multiple computing devices,
    wherein a process to create a weave of the multiple nodes associated with the first graph produces a matching weave when executed on the first graph by two different computing devices among the multiple computing devices,
    wherein the weave is an ordering of the multiple nodes,
    wherein an addition of the node to the multiple nodes associated with the first graph changes the weave of the multiple nodes associated with the first graph;
  obtain an indication to stop changing the weave of the multiple nodes associated with the first graph; and
  upon obtaining the indication to stop changing the weave of the multiple nodes associated with the first graph, add a finalize node to the first graph to obtain a second graph,
    wherein upon adding the finalize node to the first graph, the addition of the node to the second graph does not change the weave of the multiple nodes associated with the first graph.

15. The system of claim 14, comprising instructions to:
obtain the first graph including the multiple nodes and the multiple edges,
  wherein an edge among the multiple edges indicates the weave of the first graph including indicating a parent node among the multiple nodes and a child node among the multiple nodes,
    wherein the parent node occurs before the child node in the weave,
  wherein the first graph includes a branch node having a first child node and a second child node,
    wherein the first child node and the second child node do not have a parent-child relationship indicating the weave, and
    wherein the first child node includes the finalize node;
order the multiple nodes in the first graph by ordering a portion of the multiple nodes according to at least a portion of the multiple edges; and
order the first child node and the second child node by:
  obtaining a first priority associated with the finalize node represented by the first child node and a second priority associated with the second child node,
    wherein the first priority associated with the finalize node is higher than a priority associated with a node that is not the finalize node;
  determining that the first priority is higher than the second priority; and
  creating the weave by ordering the first child node before the second child node in the weave.

16. The system of claim 14, comprising instructions to:
receive a request to add a second finalize node to the second graph;
determine whether, when the second finalize node is added to the second graph, the node including the finalize node is an ancestor of the second finalize node; and
upon determining that the node including the finalize node is not an ancestor of the second finalize node, refuse to add the second finalize node to the second graph.

17. The system of claim 14, comprising instructions to:
receive a request to add a second node including a second command to the second graph,
  wherein the request indicates a user making the request;
obtain a first state associated with the second graph after executing the finalize node,
  wherein the first state indicates a first multiplicity of commands associated with the user after executing the finalize node;
determine a second state associated with the second graph by evaluating the second graph from the first state to the last node in the second graph,
  wherein the second state indicates a second multiplicity of commands associated with the user after executing the last node in the second graph;
based on the second state, determine whether the second command is included in the second multiplicity of commands; and
upon determining that the second command is not included in the second multiplicity of commands, refuse to add the second command to the second graph.

18. The system of claim 14, comprising instructions to:
obtain the weave of the first graph,
  wherein each node in the weave indicates the node and a user associated with the node;
evaluate whether the user associated with the node has a permission to issue the node;
upon determining that the user associated with the node does not have the permission to issue the node, refuse to execute the node; and
prevent the node from being executed by protecting the weave and issuing the finalize node.

19. The system of claim 14, comprising instructions to:
receive a request from a second computing device to join the multiple computing devices; and
reduce bandwidth consumption by:
- obtaining a fourth graph,
  - wherein the fourth graph includes the second graph and a node following the finalize node; and
- sending to the second computing device a state of the fourth graph at the finalize node and the node following the finalize node, without sending to the second computing device an ancestor of the finalize node.

20. The system of claim 14, comprising instructions to:
create the weave of the second graph by:
- ordering multiple nodes associated with the second graph according to ancestry indicated by multiple edges associated with the second graph;
- when the multiple edges associated with the second graph indicate ambiguous ancestry of the multiple nodes associated with the second graph, ordering the multiple nodes associated with the second graph according to multiple priorities associated with the multiple nodes having ambiguous ancestry; and
- ensuring that the weave of the second graph cannot change by assigning the highest priority to the finalize node.

* * * * *